(12) United States Patent
Glasco

(10) Patent No.: US 7,272,688 B1
(45) Date of Patent: Sep. 18, 2007

(54) METHODS AND APPARATUS FOR PROVIDING CACHE STATE INFORMATION

(75) Inventor: David B. Glasco, Austin, TX (US)

(73) Assignee: Newisys,, Inc., Austin, TX (US)

( * ) Notice: Subject to any disclaimer, the term of this patent is extended or adjusted under 35 U.S.C. 154(b) by 315 days.

(21) Appl. No.: 10/426,084

(22) Filed: Apr. 28, 2003

(51) Int. Cl.
*G06F 12/00* (2006.01)

(52) U.S. Cl. ..................... 711/141; 711/154

(58) Field of Classification Search ............ 711/141, 711/146, 144, 145; 709/206, 213, 216, 217, 709/218, 219
See application file for complete search history.

(56) References Cited

U.S. PATENT DOCUMENTS

| | | | | |
|---|---|---|---|---|
| 6,167,492 A | * | 12/2000 | Keller et al. | 711/154 |
| 6,385,705 B1 | * | 5/2002 | Keller et al. | 711/154 |
| 6,490,661 B1 | * | 12/2002 | Keller et al. | 711/150 |

OTHER PUBLICATIONS

Kim et al., "Power-aware Partitioned Cache Architectures", © 2001 ACM, pp. 64-67.*
Powell, et al., "Reducing Set-Associative Chace Energy via Way-Prediction and Selective Direct-Mapping", © 2001 IEEE, pp. 54-65.*
HyperTransport ™ I/O Link Specification Revision 1.03, HyperTransport™ Consortium, Oct. 10, 2001, Copyright© 2001 HyperTransport Technology Consortium.

* cited by examiner

*Primary Examiner*—Brian R. Peugh
(74) *Attorney, Agent, or Firm*—Beyer Weaver LLP

(57) ABSTRACT

According to the present invention, methods and apparatus are provided for increasing the efficiency of data access in a multiple processor, multiple cluster system. Mechanisms for improving the accuracy of information available to a cache coherence controller are provided in order to allow the cache coherence controller to reduce the number of transactions in a multiple cluster system. Cache state information is provided to a home cluster cache coherence controller to allow silent evictions of shared memory lines and change to dirty associated intervening requests to be efficiently handled.

37 Claims, 18 Drawing Sheets

Figure 7

| Coherence Directory 701 ||||
|---|---|---|---|
| Memory Line 711 | State 713 | Dirty Data Owner 715 | Occupancy Vector 717 |
| Address 721 | Invalid | N/A | N/A |
| Address 731 | Invalid | N/A | N/A |
| Address 741 | Shared | N/A | Clusters 1,3 |
| Address 751 | Shared | N/A | Clusters 1, 2, 3, 4 |
| Address 761 | Owned | Cluster 4 | Cluster 2, 3, 4 |
| Address 771 | Owned | Cluster 2 | Cluster 2, 4 |
| Address 781 | Modified | Cluster 2 | N/A |
| Address 791 | Modified | Cluster 3 | N/A |
| ... | ... | ... | ... |

Figure 8

| Probe Filter Information 821 | Read Block (Read) 823 | Read Block Modify (Read/Write) 825 |
|---|---|---|
| Invalid 831 | Can use completion bit. Probe home cluster. (801) | Can use completion bit. Probe home cluster. (809) |
| Shared 833 | Can use completion bit. Probe home cluster. (803) | N/A (811) |
| Owned 835 | Can use completion bit. Probe remote cluster with line cached in owned state. (805) | N/A (813) |
| Modified 837 | Can use completion bit. Probe remote cluster with line cached in modified state. (807) | Can use completion bit. Probe remote cluster. (815) |

Figure 9

| Memory Controller Filter Information 921 | | |
|---|---|---|
| | Read Block [Read] 923 | Read Block Modify [Read/Write] 925 |
| Invalid 931 | Send request to target. (901) | Send request to target. (909) |
| Shared 933 | Send request to target. (903) | Send request to target. (911) |
| Owned 935 | Forward Probe To Owning Cluster. (905) | Send request to target. (913) |
| Modified 937 | Forward Probe To Modified Cluster. (907) | Forward Probe To Modified Cluster. (915) |

Figure 12

| Initial Directory State | Installed State | Final Directory State | |
|---|---|---|---|
| I | S | S | → Cached shared in home cluster (shared bit set by HC response) 1201 |
| | E | M | → Not cached in any caches 1203 |
| S<br>OV[j] = 0<br>For all j !=<br>Requesting cluster | S | S | → Cached shared in home or requesting cache 1205 |
| | E | M | → Not cached – stale OV 1207 |
| O<br>OV[j] = 0<br>For all j != Owning cluster | S | O | → Cached in owning cache, at least 1209 |
| | E | M | → Not cached – stale OV & Owner 1211 |
| M | S | O | → Cached in owning cache 1213 |
| | E | M | → Not cached 1215 |

Figure 15

| Directory state when CtoD received (probe) | Installed State | Final Directory State | |
|---|---|---|---|
| S, OV[j] = 1 For j = CtoD requester  Or  O, OV[j] = 1 For j = CtoD requester | M | M | → CtoD succeeds 1501 |
| O, OV[j] = 0 OV[i] != 0, i != j | M | M | → CtoD succeeds 1503 |
| M | M | M | → CtoD succeeds 1505 |
| I | I | I | → CtoD fails 1507 |
| S OV[j] = 0 For j = CtoD requester | I | I | → CtoD fails 1509 |

METHODS AND APPARATUS FOR PROVIDING CACHE STATE INFORMATION

CROSS-REFERENCE TO RELATED APPLICATIONS

The present application is related to filed U.S. patent application Ser. Nos. 10/288,347, now U.S. Pat. No. 7,003,633, and 10/288,399 now U.S. Pat. No. 7,103,726, both titled Methods And Apparatus For Managing Probe Requests by David B. Glasco and filed on Nov. 4, 2002, the entireties of which are incorporated by reference herein for all purposes.

BACKGROUND OF THE INVENTION

1. Field of the Invention

The present invention generally relates to accessing data in a multiple processor system. More specifically, the present invention provides techniques for improving data access efficiency while maintaining cache coherency in a multiple processor system having a multiple cluster architecture.

2. Description of Related Art

Performance limitations have led to the development of a point-to-point architecture for connecting processors in a system with a single memory space. In one example, individual processors can be directly connected to each other through a plurality of point-to-point links to form a cluster of processors. Separate clusters of processors can also be connected. The point-to-point links significantly increase the bandwidth for coprocessing and multiprocessing functions.

In such a multiple processor, multiple cluster system, processors send probe requests in order to perform operations on particular memory lines that may be cached in local or remote nodes. Some common operations include read block and read block modify operations on memory lines. In many examples, cache coherence controllers manage the transmission of probes and probe requests between clusters. However, the information available to a cache coherence controller in a coherence directory may not accurately reflect the actual states of memory lines cached in remote clusters. In particular, many unnecessary probe requests may be sent to remote clusters because of either limited or stale information available to a cache coherence controller.

Consequently, it is desirable to provide techniques for improving the management and distribution of probe requests in systems having multiple clusters of multiple processors connected using point-to-point links.

SUMMARY OF THE INVENTION

According to the present invention, methods and apparatus are provided for increasing the efficiency of data access in a multiple processor, multiple cluster system. Mechanisms for improving the accuracy of information available to a cache coherence controller are provided in order to allow the cache coherence controller to reduce the number of transactions in a multiple cluster system. Cache state information is provided to a home cluster cache coherence controller to allow silent evictions of shared memory lines and change to dirty associated intervening requests to be efficiently handled.

In one aspect, a computer system is provided. The computer system includes a home cluster and a request cluster. The home cluster includes a first plurality of processors and a home cache coherence controller associated with a coherence directory. The coherence directory has state information corresponding to home cluster memory lines cached remotely. A request cluster includes a second plurality of processors and a request cache coherence controller. The request cache coherence controller is configured to probe request cluster nodes to obtain cache state information associated with a memory line. The cache state information is provided to a request cluster processor and to the home cache coherence controller to provide the home cache coherence controller with accurate cache state information for updating the coherence directory.

In another aspect, a method for providing information on cache state is provided. A read request associated with a memory line is received from a first processor in a first cluster. Nodes in the first cluster are probed to obtain cache state information associated with the memory line. Cache state information is forwarded to the first processor. Cache state information is forwarded to a second cluster to update a coherence directory in the second cluster. The coherence directory provides state information of cache memory lines.

In yet another aspect, a computer system includes a home cluster and a request cluster. The home cluster includes a first plurality of processors and a home cache coherence controller associated with a coherence directory. The coherence directory has state information corresponding to home cluster memory lines cached remotely. The request cluster includes a second plurality of processors and a request cache coherence controller. The request cache coherence controller is configured to forward a change to dirty request to a home cluster and probe request cluster nodes to obtain cache state information associated with a memory line. The cache state information is provided to a request cluster processor and to the home cache coherence controller to provide the home cache coherence controller with information to determine whether the change to dirty request was successful.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 7 is a diagrammatic representation showing a cache coherence directory.

FIG. 8 is a diagrammatic representation showing probe filter information that can be used to reduce the number of probes transmitted to various clusters.

FIG. 9 is a diagrammatic representation showing memory controller filter information.

FIG. 12 is a table showing updates to a coherence directory upon receiving cache state information associated with a request.

FIG. 15 is a table showing updates to a coherence directory upon receiving cache state information associated with a change to dirty request.

DETAILED DESCRIPTION OF SPECIFIC EMBODIMENTS

Figure 1A:
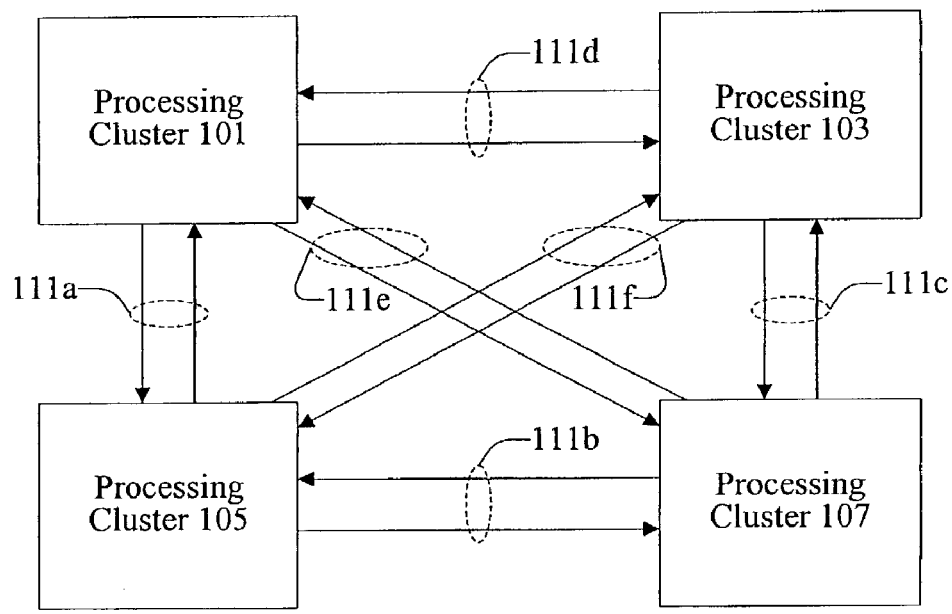
FIGS. 1A and 1B are diagrammatic representation depicting a system having multiple clusters.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Multi-processor architectures having point-to-point communication among their processors are suitable for implementing specific embodiments of the present invention. In the following description, numerous specific details are set forth in order to provide a thorough understanding of the present invention. The present invention may be practiced without some or all of these specific details. Well-known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Techniques are provided for increasing data access efficiency in a multiple processor, multiple cluster system. In a point-to-point architecture, a cluster of processors includes multiple processors directly connected to each other through point-to-point links. By using point-to-point links instead of a conventional shared bus or external network, multiple processors are used efficiently in a system sharing the same memory space. Processing and network efficiency are also improved by avoiding many of the bandwidth and latency limitations of conventional bus and external network based multiprocessor architectures. According to various embodiments, however, linearly increasing the number of processors in a point-to-point architecture leads to an exponential increase in the number of links used to connect the multiple processors. In order to reduce the number of links used and to further modularize a multiprocessor system using a point-to-point architecture, multiple clusters are used.

According to various embodiments, the multiple processor clusters are interconnected using a point-to-point architecture. Each cluster of processors includes a cache coherence controller used to handle communications between clusters. In one embodiment, the point-to-point architecture used to connect processors are used to connect clusters as well.

By using a cache coherence controller, multiple cluster systems can be built using processors that may not necessarily support multiple clusters. Such a multiple cluster system can be built by using a cache coherence controller to represent non-local nodes in local transactions so that local nodes do not need to be aware of the existence of nodes outside of the local cluster. More detail on the cache coherence controller will be provided below.

In a single cluster system, cache coherency can be maintained by sending all data access requests through a serialization point. Any mechanism for ordering data access requests is referred to herein as a serialization point. One example of a serialization point is a memory controller. Various processors in the single cluster system send data access requests to the memory controller. In one example, the memory controller is configured to serialize or lock the data access requests so that only one data access request for a given memory line is allowed at any particular time. If another processor attempts to access the same memory line, the data access attempt is blocked until the memory line is unlocked. The memory controller allows cache coherency to be maintained in a multiple processor, single cluster system.

A serialization point can also be used in a multiple processor, multiple cluster system where the processors in the various clusters share a single address space. By using a single address space, internal point-to-point links can be used to significantly improve intercluster communication over traditional external network based multiple cluster systems. Various processors in various clusters send data access requests to a memory controller associated with a particular cluster such as a home cluster. The memory controller can similarly serialize all data requests from the different clusters. However, a serialization point in a multiple processor, multiple cluster system may not be as efficient as a serialization point in a multiple processor, single cluster system. That is, delay resulting from factors such as latency from transmitting between clusters can adversely affect the response times for various data access requests. It should be noted that delay also results from the use of probes in a multiple processor environment.

Although delay in intercluster transactions in an architecture using a shared memory space is significantly less than the delay in conventional message passing environments using external networks such as Ethernet or Token Ring, even minimal delay is a significant factor. In some applications, there may be millions of data access requests from a processor in a fraction of a second. Any delay can adversely impact processor performance.

According to various embodiments, probe management is used to increase the efficiency of accessing data in a multiple processor, multiple cluster system. A mechanism for eliciting a response from a node to maintain cache coherency in a system is referred to herein as a probe. In one example, a mechanism for snooping a cache is referred to as a probe. A response to a probe can be directed to the source or target of the initiating request. Any mechanism for filtering or reducing the number of probes and probe requests transmitted to various nodes is referred to herein as managing probes. In one example, managing probe entails characterizing a probe request to determine if a probe can be transmitted to a reduced number of entities.

In typical implementations, probe requests are sent to a memory controller that broadcasts probes to various nodes in a system. In such a system, no knowledge of the cache line state is known. All nodes in the system are probed and the request cluster receives a response from each node. In a system with a coherence directory, state information associated with various memory lines can be used to reduce the number of transactions. Any mechanism for maintaining state information associated with various memory lines is referred to herein as a coherence directory. A coherence directory typically includes information for memory lines in a local cluster that are cached in a remote cluster. According to various embodiments, a coherence directory is used to reduce the number of probes to remote clusters by inferring the state of local caches. In other embodiments, a coherence directory is used to eliminate the transmission of a request to a memory controller in a home cluster.

FIG. 1A is a diagrammatic representation of one example of a multiple cluster, multiple processor system that can use the techniques of the present invention. Each processing cluster 101, 103, 105, and 107 can include a plurality of processors. The processing clusters 101, 103, 105, and 107 are connected to each other through point-to-point links 111a-f. In one embodiment, the multiple processors in the multiple cluster architecture shown in FIG. 1A share the same memory space. In this example, the point-to-point links 111a-f are internal system connections that are used in place of a traditional front-side bus to connect the multiple processors in the multiple clusters 101, 103, 105, and 107. The point-to-point links may support any point-to-point coherence protocol.

Figure 1B:
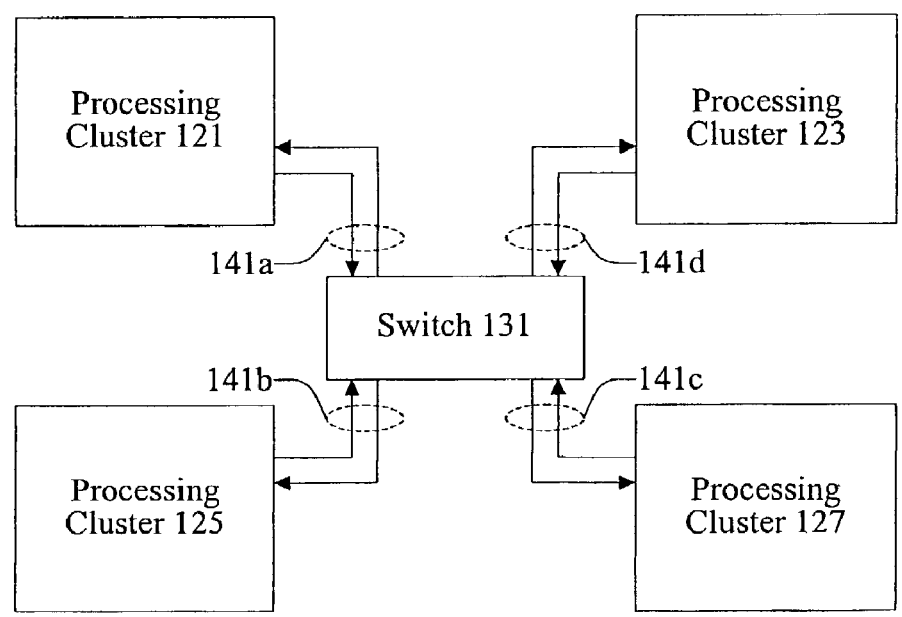

FIG. 1B is a diagrammatic representation of another example of a multiple cluster, multiple processor system that can use the techniques of the present invention. Each processing cluster 121, 123, 125, and 127 can be coupled to a switch 131 through point-to-point links 141a-d. It should be noted that using a switch and point-to-point links allows implementation with fewer point-to-point links when connecting multiple clusters in the system. A switch 131 can include a processor with a coherence protocol interface. According to various implementations, a multicluster system shown in FIG. 1A is expanded using a switch 131 as shown in FIG. 1B.

Figure 2:
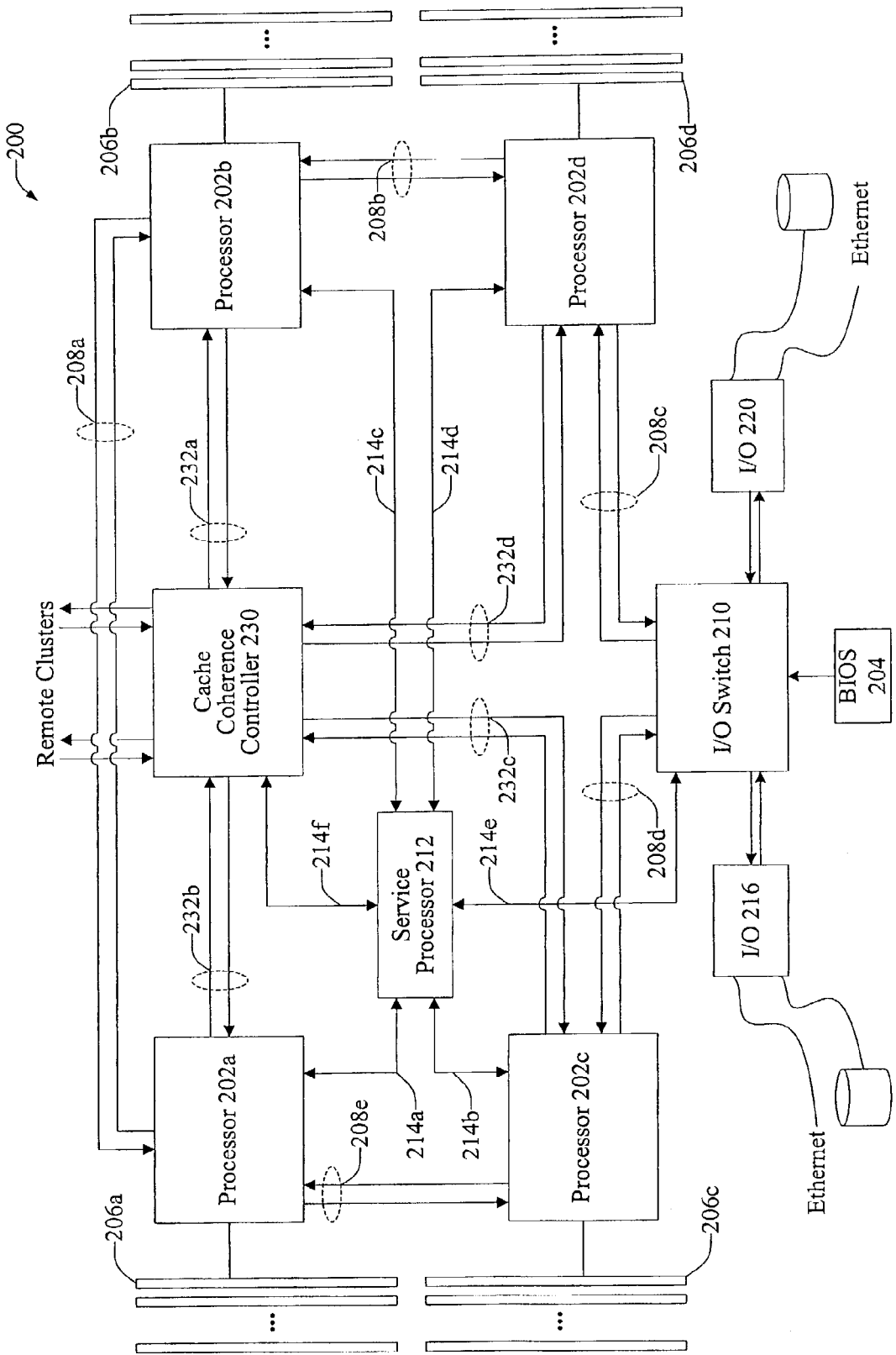
FIG. 2 is a diagrammatic representation of a cluster having a plurality of processors.

FIG. 2 is a diagrammatic representation of a multiple processor cluster, such as the cluster 101 shown in FIG. 1A. Cluster 200 includes processors 202a-202d, one or more Basic I/O systems (BIOS) 204, a memory subsystem comprising memory banks 206a-206d, point-to-point communication links 208a-208e, and a service processor 212. The point-to-point communication links are configured to allow interconnections between processors 202a-202d, I/O switch 210, and cache coherence controller 230. The service processor 212 is configured to allow communications with processors 202a-202d, I/O switch 210, and cache coherence controller 230 via a JTAG interface represented in FIG. 2 by links 214a-214f. It should be noted that other interfaces are supported. It should also be noted that in some implementations, a service processor is not included in multiple processor clusters. I/O switch 210 connects the rest of the system to I/O adapters 216 and 220.

According to specific embodiments, the service processor of the present invention has the intelligence to partition system resources according to a previously specified partitioning schema. The partitioning can be achieved through direct manipulation of routing tables associated with the system processors by the service processor which is made possible by the point-to-point communication infrastructure. The routing tables are used to control and isolate various system resources, the connections between which are defined therein.

The processors 202a-d are also coupled to a cache coherence controller 230 through point-to-point links 232a-d. Any mechanism or apparatus that can be used to provide communication between multiple processor clusters while maintaining cache coherence is referred to herein as a cache coherence controller. The cache coherence controller 230 can be coupled to cache coherence controllers associated with other multiprocessor clusters. It should be noted that there can be more than one cache coherence controller in one cluster. The cache coherence controller 230 communicates with both processors 202a-d as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of server 200 will be assumed. For example, most of the resources shown in FIG. 2 are assumed to reside on a single electronic assembly. In addition, memory banks 206a-206d may comprise double data rate (DDR) memory which is physically provided as dual in-line memory modules (DIMMs). I/O adapter 216 may be, for example, an ultra direct memory access (UDMA) controller or a small computer system interface (SCSI) controller which provides access to a permanent storage device. I/O adapter 220 may be an Ethernet card adapted to provide communications with a network such as, for example, a local area network (LAN) or the Internet.

According to a specific embodiment and as shown in FIG. 2, both of I/O adapters 216 and 220 provide symmetric I/O access. That is, each provides access to equivalent sets of I/O. As will be understood, such a configuration would facilitate a partitioning scheme in which multiple partitions have access to the same types of I/O. However, it should also be understood that embodiments are envisioned in which partitions without I/O are created. For example, a partition including one or more processors and associated memory resources, i.e., a memory complex, could be created for the purpose of testing the memory complex.

According to one embodiment, service processor 212 is a Motorola MPC855T microprocessor which includes integrated chipset functions. The cache coherence controller 230 is an Application Specific Integrated Circuit (ASIC) supporting the local point-to-point coherence protocol. The cache coherence controller 230 can also be configured to handle a non-coherent protocol to allow communication with I/O devices. In one embodiment, the cache coherence controller 230 is a specially configured programmable chip such as a programmable logic device or a field programmable gate array.

Figure 3:
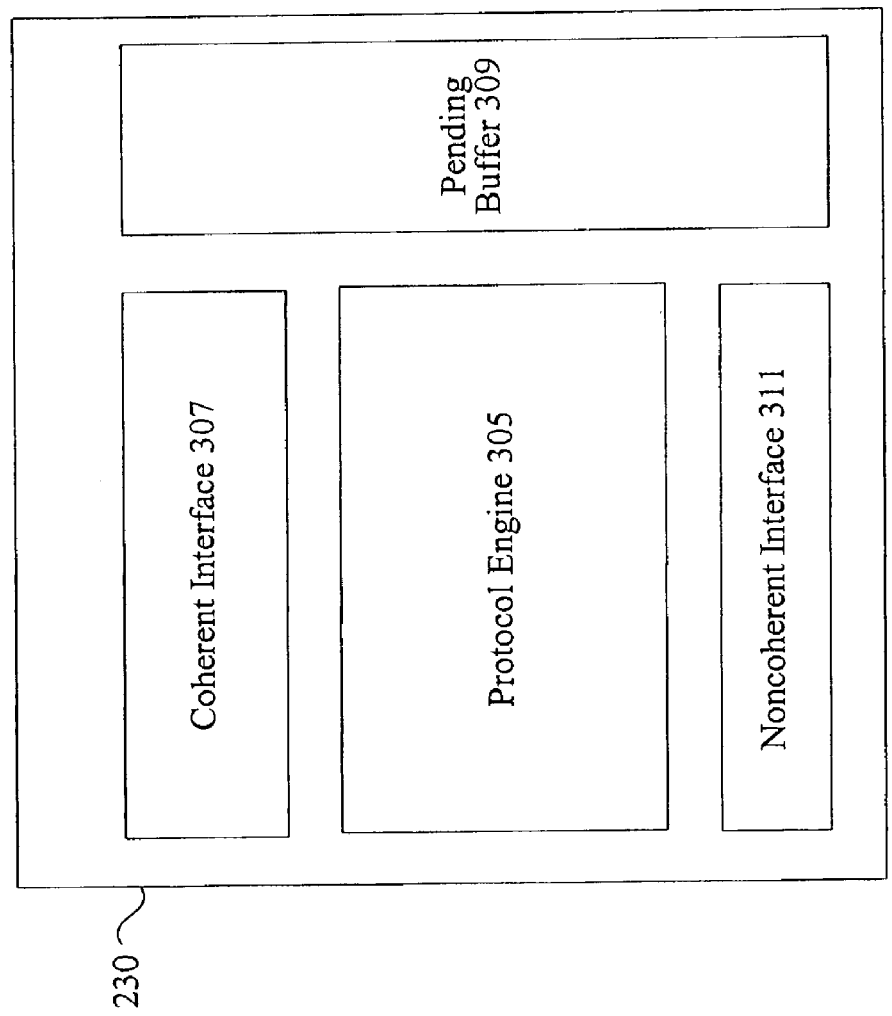
FIG. 3 is a diagrammatic representation of a cache coherence controller.

FIG. 3 is a diagrammatic representation of one example of a cache coherence controller 230. According to various embodiments, the cache coherence controller includes a protocol engine 305 configured to handle packets such as probes and requests received from processors in various clusters of a multiprocessor system. The functionality of the protocol engine 305 can be partitioned across several engines to improve performance. In one example, partitioning is done based on packet type (request, probe and response), direction (incoming and outgoing), or transaction flow (request flows, probe flows, etc).

The protocol engine 305 has access to a pending buffer 309 that allows the cache coherence controller to track transactions such as recent requests and probes and associate the transactions with specific processors. Transaction information maintained in the pending buffer 309 can include transaction destination nodes, the addresses of requests for subsequent collision detection and protocol optimizations, response information, tags, and state information.

The cache coherence controller has an interface such as a coherent protocol interface 307 that allows the cache coherence controller to communicate with other processors in the cluster as well as external processor clusters. According to various embodiments, each interface 307 and 311 is implemented either as a full crossbar or as separate receive and transmit units using components such as multiplexers and buffers. The cache coherence controller can also include other interfaces such as a non-coherent protocol interface 311 for communicating with I/O devices. It should be noted, however, that the cache coherence controller 230 does not necessarily need to provide both coherent and non-coherent interfaces. It should also be noted that a cache coherence controller in one cluster can communicate with a cache coherence controller in another cluster.

Figure 4:
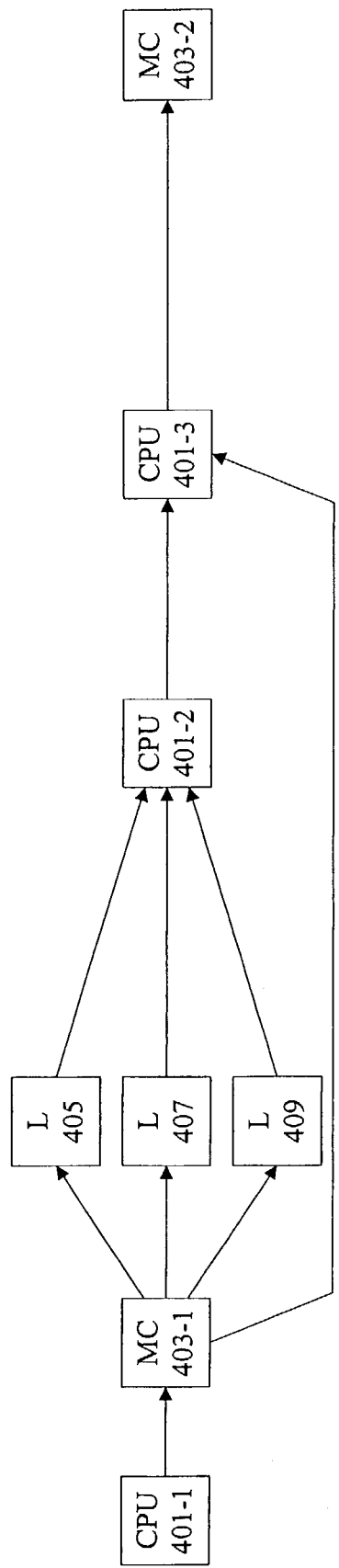
FIG. 4 is a diagrammatic representation showing a transaction flow for a data access request from a processor in a single cluster.

FIG. 4 is a diagrammatic representation showing the transactions for a cache request from a processor in a system having a single cluster without using a cache coherence controller. A processor 401-1 sends an access request such as a read memory line request to a memory controller 403-1. The memory controller 403-1 may be associated with this processor, another processor in the single cluster or may be a separate component such as an ASIC or specially configured Programmable Logic Device (PLD). To preserve cache coherence, only one processor is typically allowed to access a memory line corresponding to a shared address space at anyone given time. To prevent other processors from attempting to access the same memory line, the memory line can be locked by the memory controller 403-1. All other requests to the same memory line are blocked or queued. Access by another processor is typically only allowed when the memory controller 403-1 unlocks the memory line.

The memory controller 403-1 then sends probes to the local cache memories 405, 407, and 409 to determine cache states. The local cache memories 405, 407, and 409 then in turn send probe responses to the same processor 401-2. The memory controller 403-1 also sends an access response such as a read response to the same processor 401-3. The processor 401-3 can then send a done response to the memory controller 403-2 to allow the memory controller 403-2 to unlock the memory line for subsequent requests. It should be noted that CPU 401-1, CPU 401-2, and CPU 401-3 refer to the same processor.

FIGS. 5A-5D are diagrammatic representations depicting cache coherence controller operation. The use of a cache coherence controller in multiprocessor clusters allows the creation of a multiprocessor, multicluster coherent domain without affecting the functionality of local nodes such as processors and memory controllers in each cluster. In some instances, processors may only support a protocol that allows for a limited number of processors in a single cluster without allowing for multiple clusters. The cache coherence controller can be used to allow multiple clusters by making local processors believe that the non-local nodes are merely a single local node embodied in the cache coherence controller. In one example, the processors in a cluster do not need to be aware of processors in other clusters. Instead, the processors in the cluster communicate with the cache coherence controller as though the cache coherence controller were representing all non-local nodes.

It should be noted that nodes in a remote cluster will be referred to herein as non-local nodes or as remotes nodes. However, non-local nodes refer to nodes not in a request cluster generally and includes nodes in both a remote cluster and nodes in a home cluster. A cluster from which a data access or cache access request originates is referred to herein as a request cluster. A cluster containing a serialization point is referred to herein as a home cluster. Other clusters are referred to as remote clusters. The home cluster and the remote cluster are also referred to herein as non-local clusters.

Figure 5A:
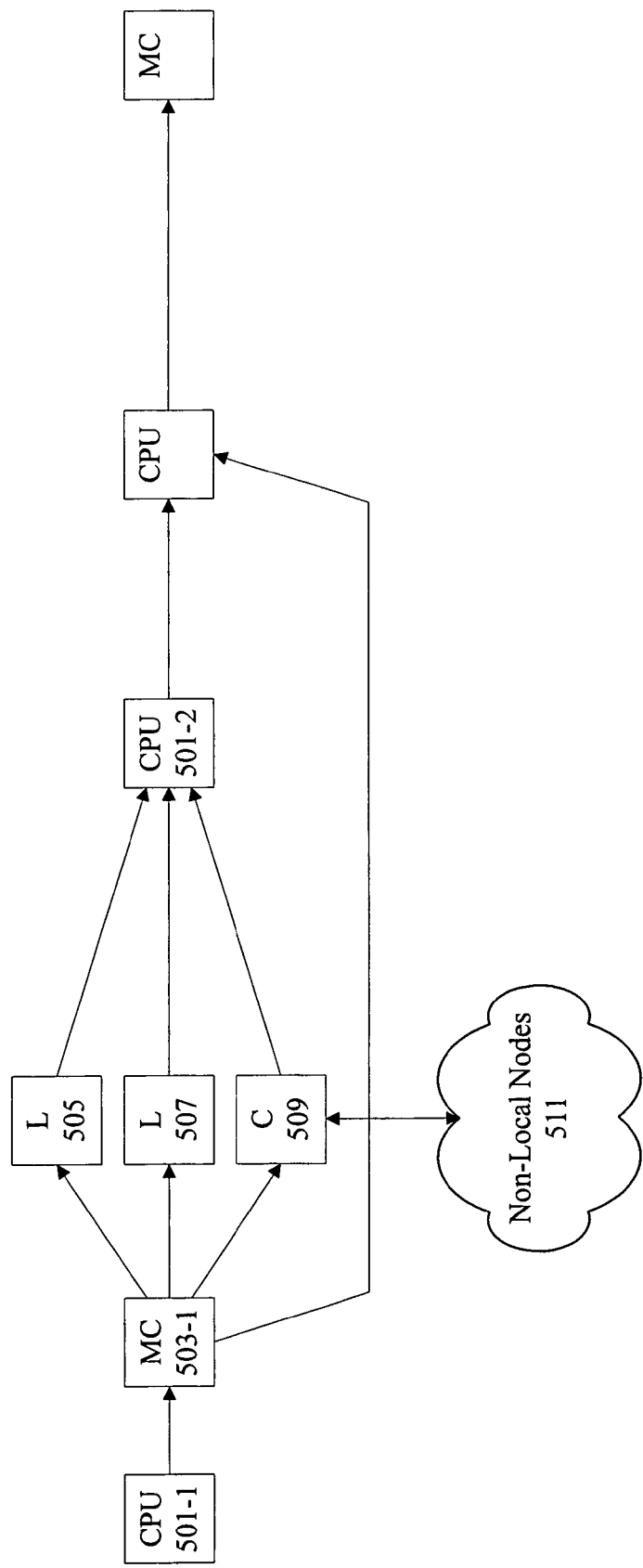
FIGS. 5A-5D are diagrammatic representations showing cache coherence controller functionality.

FIG. 5A shows the cache coherence controller acting as an aggregate remote cache. When a processor 501-1 generates a data access request to a local memory controller 503-1, the cache coherence controller 509 accepts the probe from the local memory controller 503-1 and forwards it to non-local node portion 511. It should be noted that a coherence protocol can contain several types of messages. In one example, a coherence protocol includes four types of messages; data or cache access requests, probes, responses or probe responses, and data packets. Data or cache access requests usually target the home node memory controller. Probes are used to query each cache in the system. The probe packet can carry information that allows the caches to properly transition the cache state for a specified line. Responses are used to carry probe response information and to allow nodes to inform other nodes of the state of a given transaction. Data packets carry request data for both write requests and read responses.

According to various embodiments, the memory address resides at the local memory controller. As noted above, nodes including processors and cache coherence controllers outside of a local cluster are referred to herein as non-local nodes. The cache coherence controller 509 then accumulates the response from the non-local nodes and sends a single response in the same manner that local nodes associated with cache blocks 505 and 507 send a single response to processor 501-2. Local processors may expect a single probe response for every local node probed. The use of a cache coherence controller allows the local processors to operate without concern as to whether non-local nodes exist.

It should also be noted that components such as processor 501-1 and processor 501-2 refer herein to the same component at different points in time during a transaction sequence. For example, processor 501-1 can initiate a data access request and the same processor 501-2 can later receive probe responses resulting from the request.

Figure 5B:
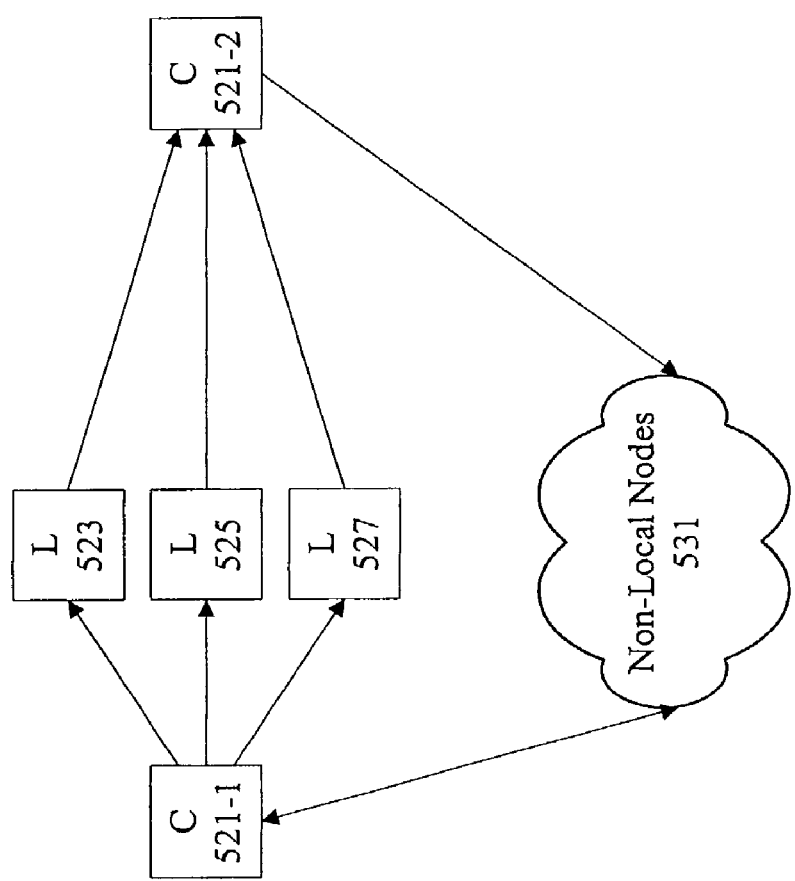

FIG. 5B shows the cache coherence controller acting as a probing agent pair. When the cache coherence controller 521-1 receives a probe from non-local nodes 531, the cache coherence controller 521-1 accepts the probe and forwards the probe to local nodes associated with cache blocks 523, 525, and 527. The cache coherence controller 521-2 then forwards a final response to the non-local node portion 531. In this example, the cache coherence controller is both the source and the destination of the probes. The local nodes associated with cache blocks 523, 525, and 527 behave as if the cache coherence controller were a local processor with a local memory request.

Figure 5C:
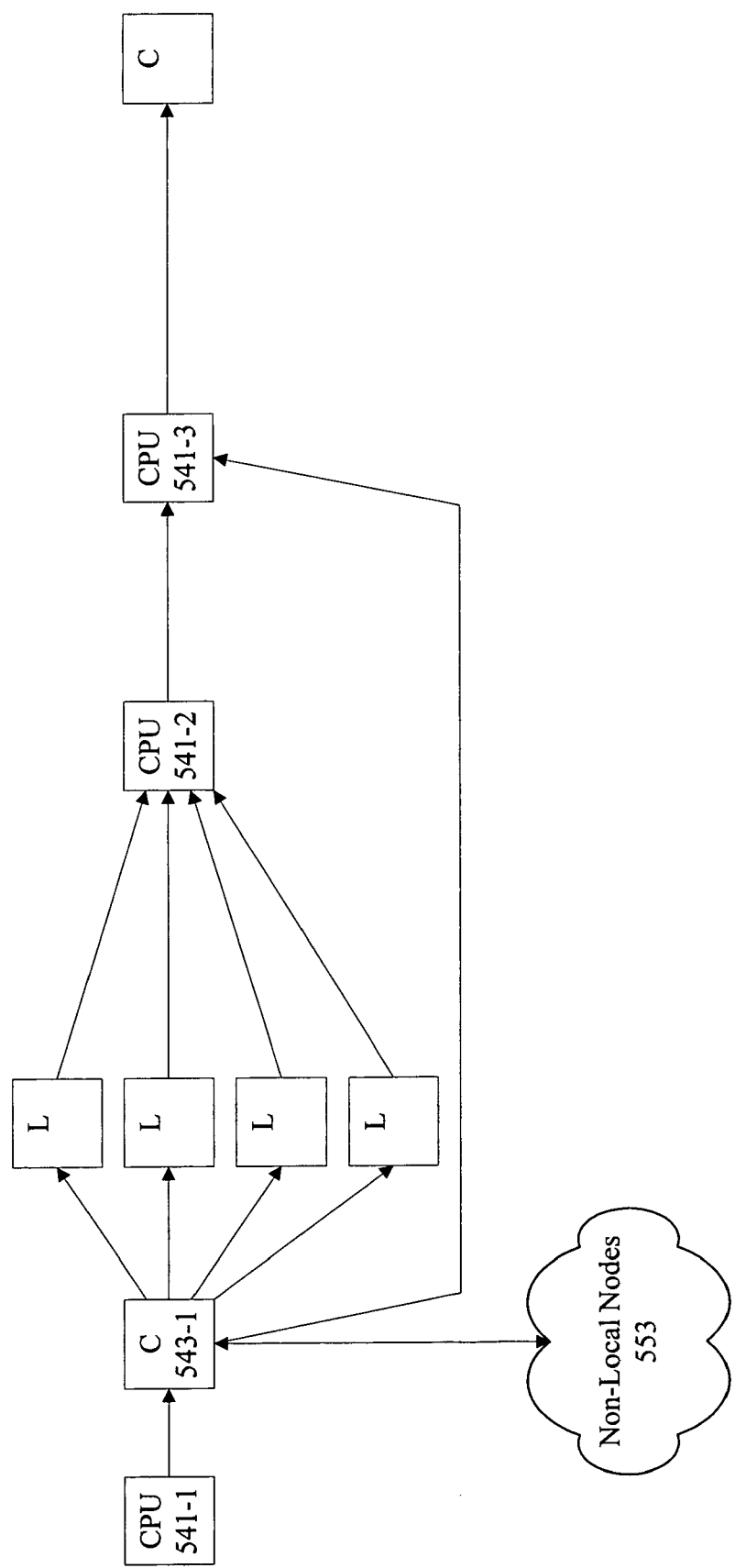

FIG. 5C shows the cache coherence controller acting as a remote memory. When a local processor 541-1 generates an access request that targets remote memory, the cache coherence controller 543-1 forwards the request to the non-local nodes 553. When the remote request specifies local probing, the cache coherence controller 543-1 generates probes to local nodes and the probed nodes provide responses to the processor 541-2. Once the cache coherence controller 543-1 has received data from the non-local node portion 553, it forwards a read response to the processor 541-3. The cache coherence controller also forwards the final response to the remote memory controller associated with non-local nodes 553.

Figure 5D:
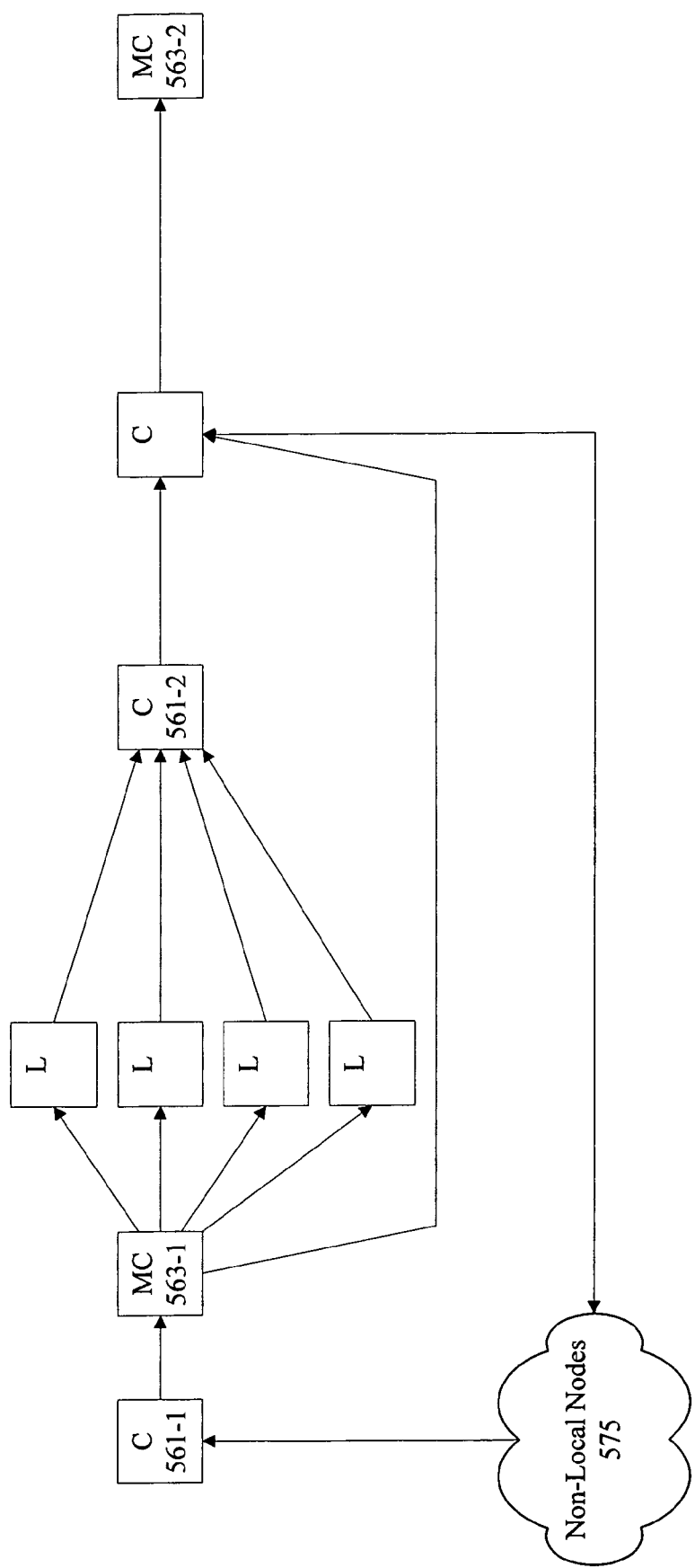

FIG. 5D shows the cache coherence controller acting as a remote processor. When the cache coherence controller 561-1 at a first cluster receives a request from a processor in a second cluster, the cache coherence controller acts as a first cluster processor on behalf of the second cluster processor. The cache coherence controller 561-1 accepts the request from portion 575 and forwards it to a memory controller 563-1. The cache coherence controller 561-2 then accumulates all probe responses as well as the data fetched and forwards the final response to the memory controller 563-2 as well as to non-local nodes 575.

By allowing the cache coherence controller to act as an aggregate remote cache, probing agent pair, remote memory, and remote processor, multiple cluster systems can be built using processors that may not necessarily support multiple clusters. The cache coherence controller can be used to represent non-local nodes in local transactions so that local nodes do not need to be aware of the existence of nodes outside of the local cluster.

Figure 6:
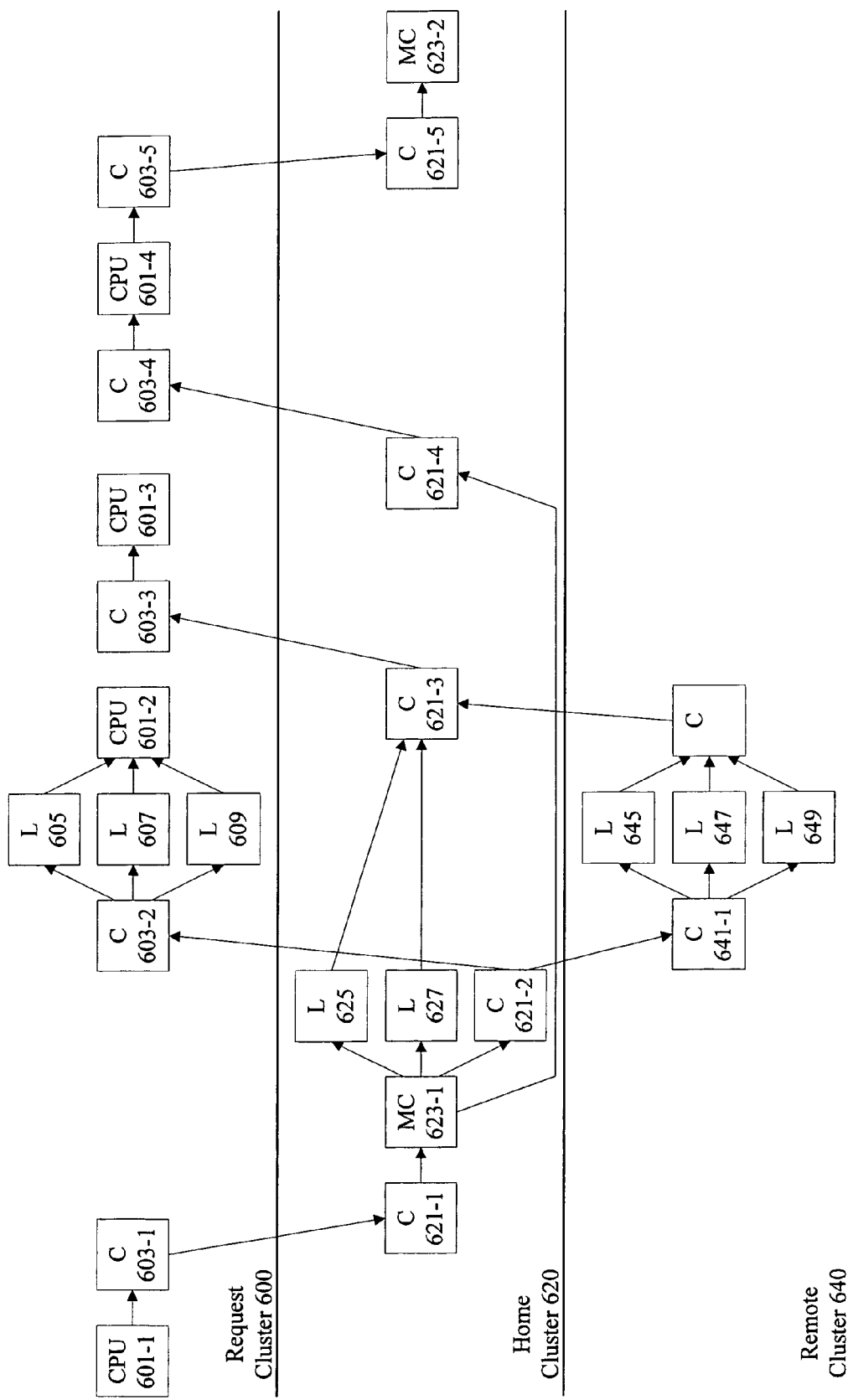
FIG. 6 is a diagrammatic representation depicting a transaction flow for a probe request with multiple probe responses.

FIG. 6 is a diagrammatic representation depicting the transactions for a data request from a local processor sent to a non-local cluster using a cache coherence controller. The multicluster system includes a request cluster 600, a home cluster 620, and a remote cluster 640. As noted above, the home cluster 620 and the remote cluster 640 as well as any other clusters excluding the request cluster 600 are referred to herein as non-local clusters. Processors and cache coherence controllers associated with local and non-local clusters are similarly referred to herein as local processors, local cache coherence controllers, non-local processors, and non-local cache coherence controllers, respectively.

According to various embodiments, processor 601-1 in a local cluster 600 sends a data access request such as a read request to a cache coherence controller 603-1. The cache coherence controller 603-1 tracks the transaction in the pending buffer of FIG. 3 and forwards the request to a cache coherence controller 621-1 in a home cluster 620. The cache coherence controller 621-1 at the home cluster 620 receives the access request and tracks the request in its pending buffer. In one example, information associated with the requests are stored in the pending buffer. The cache coherence controller 621-1 forwards the access request to a memory controller 623-1 also associated with the home cluster 620. At this point, the memory controller 623-1 locks the memory line associated with the request. In one example, the memory line is a unique address in the memory space shared by the multiple processors in the request cluster 600, home cluster 620, and the remote cluster 640. The memory controller 623-1 generates a probe associated with the data access request and forwards the probe to local nodes associated with cache blocks 625 and 627 as well as to cache coherence controller 621-2.

It should be noted that although messages associated with requests, probes, responses, and data are described as forwarded from one node to another, the messages themselves may contain variations. In one example, alterations are made to the messages to allow the multiple cluster architecture to be transparent to various local nodes. It should be noted that write requests can be handled as well. In write requests, the targeted memory controller gathers responses and sends the responses to the processor when gathering is complete.

The cache coherence controller 641-1 associated with the remote cluster 640 receives a probe from cache coherence controller 621-2 and probes local nodes associated with cache blocks 645, 647, and 649. Similarly, the cache coherence controller 603-2 associated with the request cluster 600 receives a probe and forwards the probe to local nodes associated with cache blocks 605, 607, and 609 to probe the cache blocks in the request cluster 600. Processor 601-2 receives probe responses from the local nodes associated with cache blocks 605, 607, and 609.

According to various embodiments, cache coherence controller 621-3 accumulates probe responses and sends the probe responses to cache coherence controller 603-3, which in turn forwards the probe responses to the processor 601-3. Cache coherence controller 621-4 also sends a read response to cache coherence controller 603-4, which forwards the read response to processor 601-4. While probes and probe responses carry information for maintaining cache coherency in the system, read responses can carry actual fetched data. After receiving the fetched data, processor 601-4 may send a source done response to cache coherence controller 603-5. According to various embodiments, the transaction is now complete at the requesting cluster 600. Cache coherence controller 603-5 forwards the source done message to cache coherence controller 621-5. Cache coherence controller 621-5 in turn sends a source done message to memory controller 623-2. Upon receiving the source done message, the memory controller 623-2 can unlock the memory line and the transaction at the home cluster 620 is now complete. Another processor can now access the unlocked memory line.

It should be noted that because the cache coherence controller 621-3 waits for remote cluster probe responses before sending a probe response to cache coherence controller 603-3, delay is introduced into the system. According to various embodiments, probe responses are gathered at cache coherence controller 603-3. By having remote clusters send probe responses through a home cluster, both home cluster probe responses and remote cluster probe responses can be delayed at the home cache coherence controller. In one example, remote cluster probe responses have to travel an additional hop in order to reach a request cluster. The latency for transmission of a probe response between a remote cluster and a request cluster may be substantially less than the latency for transmission of a probe response between a remote cluster and a request cluster through a home cluster. Home cluster probe responses are also delayed as a result of this added hop.

As will be appreciated by one of skill in the art, the specific transaction sequences involving requests, probes, and response messages can vary depending on the specific implementation. In one example, a cache coherence controller 621-3 may wait to receive a read response message from a memory controller 623-1 before transmitting both a probe response message and a read response message to a cache coherence controller 603-3. In other examples, a cache coherence controller may be the actual processor generating the request. Some processors may operate as both a processor and as a cache coherence controller. Furthermore, various data access request messages, probes, and responses associated with reads and writes are contemplated. As noted above, any message for snooping a cache can be referred to as a probe. Similarly, any message for indicating to the memory controller that a memory line should be unlocked can be referred to as a source done message.

It should be noted that the transactions shown in FIG. 6 show examples of cache coherence controllers performing many different functions, including functions of remote processors, aggregate local caches, probing agent pairs, and remote memory as described with reference to FIGS. 5A-5D.

The cache coherence controller 621-1 at the home cluster 620 is acting as a remote processor. When the cache coherence controller receives a request from a request cluster processor, the cache coherence controller is directed to act as the requesting processor on behalf of the request cluster processor. In this case, the cache coherence controller 621-1 accepts a forwarded request from processor 601-1 and sends it to the memory controller 623-1, accumulates responses from all local nodes and the memory controller 623-1, and forwards the accumulated responses and data back to the requesting processor 601-3. The cache coherence controller 621-5 also forwards a source done to the local memory controller 623-2.

The cache coherence controller 603-1 at the request cluster 600 is acting as a remote memory. As remote memory, the cache coherence controller is designed to forward a request from a processor to a proper remote cluster and ensure that local nodes are probed. In this case, the cache coherence controller 603-1 forwards a probe to cache coherence controller 621-1 at a home cluster 620. Cache coherence controller 603-2 also probes local nodes 605, 607, and 609.

The cache coherence controller 641-1 at the request cluster 640 is acting as a probing agent pair. As noted above, when a cache coherence controller acting as a probing agent pair receives a probe from a remote cluster, the cache coherence controller accepts the probe and forwards it to all local nodes. The cache coherence controller accumulates the responses and sends a final response back to the request cluster. Here, the cache coherence controller 641-1 sends a probe to local nodes associated with cache blocks 645, 647, and 649, gathers probe responses and sends the probe responses to cache coherence controller 621-3 at home cluster 620. Similarly, cache coherence controller 603-2 also acts as a probing agent pair at a request cluster 600. The cache coherence controller 603-2 forwards probe requests to local nodes including local nodes associated with cache blocks 605, 607, and 609.

The cache coherence controller 621-2 and 621-3 is also acting as an aggregate remote cache. The cache coherence controller 621-2 is responsible for accepting the probe from the memory controller 623-1 and forwarding the probe to the other processor clusters 600 and 640. More specifically, the cache coherence controller 621-2 forwards the probe to cache coherence controller 603-2 corresponding to request cluster 600 and to cache coherence controller 641-1 corresponding to remote cluster 640. As noted above, using a multiple cluster architecture may introduce delay as well as other undesirable elements such as increased traffic and processing overhead.

Probes are transmitted to all clusters in the multiple cluster system even though not all clusters need to be probed. For example, if a memory line associated with a probe request is invalid or absent from cache, it may not be necessary to probe all of the caches associated with the various clusters. In a system without a coherence directory, it is typically necessary to snoop all clusters. However, by using a coherence directory, the number of transactions in the system can be reduced by probing only a subset of the clusters in a system in order to minimize traffic and processing overhead.

By using a coherence directory, global memory line state information (with respect to each cluster) can be maintained and accessed by a memory controller or a cache coherence controller in a particular cluster. According to various embodiments, the coherence directory tracks and manages the distribution of probes as well as the receipt of responses. If coherence directory information indicates that probing of a specific cluster is not required, the probe to the specific cluster can be eliminated. In one example, a coherence directory indicates that probing of requesting and remote clusters is not necessary. A cache coherence controller in a home cluster probes local nodes without forwarding probes to the request and remote clusters. The cache coherence controller in the home cluster then sends a response to the request cluster after probe responses are received. However, in typical multiple cluster systems, a requesting cluster expects a predetermined number of responses from the various probed clusters. In one example, if the multiple cluster system includes four clusters, a request cluster would expect probe responses associated with nodes in all four clusters.

FIG. 7 is one example of a coherence directory that can be used to allow management and filtering of probes. Various coherence directories are available. In one example, a full directory provides an entry for every memory line in a system. In this example, the coherence directory is maintained at the memory controller and is accessible by a cache coherence controller. However, in a system with a large amount of system memory, a full directory may not be efficient or practical. According to various embodiments, a sparse directory is provided with a limited number of entries associated with a selected set of memory lines. In one example, the coherence directory 701 includes state information 713, dirty data owner information 715, and an occupancy vector 717 associated with the memory lines 711. In some embodiments, the memory line states are modified, owned, shared, and invalid.

In the invalid state, a memory line is not currently available in cache associated with any remote cluster. In the shared state, a memory line may be present in more than one cache, but the memory line has not been modified in any of these caches. When a memory line is in the shared state, an occupancy vector 717 can be checked to determine what caches share the relevant data. An occupancy vector 717 may be implemented as an N-bit string, where each bit represents the availability of the data in the cache of N clusters. Any mechanism for tracking what clusters hold a copy of the relevant memory line in cache is referred to herein as an occupancy vector. The memory line with address 741 is in the shared state, and the occupancy vector 717 indicates that clusters 1 and 3 each have a copy of the shared memory line in cache.

In the modified state, a memory line has been modified and the modified copy exists in cache associated with a particular cluster. When a memory line is modified, dirty data owner information field 715 can be checked to determine the owner of the dirty data. Any mechanism for indicating what cluster owns a modified copy of the memory line in cache is referred to herein as a dirty data owner information field. In one example, the memory line associated with address 781 is modified, and the dirty data owner field 715 indicates that cluster 2 owns the memory line.

In the owned state, a dirty memory line is owned by a single cache but may be resident in multiple caches. It has been read by the owning cache and has been modified. In this case, the copy held in memory is stale. If the memory line is in the owned state, dirty data owner field 715 can be accessed to determine which cluster owns the dirty data. In one example, the memory line associated with address 761 is in the owned state and is owned by cluster 4. The occupancy vector 717 can also be checked to determine what other caches may have the relevant data. In this example, the occupancy vector 717 indicates that clusters 2, 3, and 4 each have a copy of the data associated with the memory line in cache.

Although the coherence directory 701 includes the four states of modified, owned, shared, and invalid, it should be noted that particular implementations may use a different set of states. In one example, a system may have the five states of modified, exclusive, owned, shared, and invalid. In the exclusive state, a memory line may be accessible to a particular node in a remote cluster, but the node in the remote cluster has not yet written data to the cache line. The techniques of the present invention can be used with a variety of different possible memory line states.

The coherence directory tracks the various transactions such as probe requests and responses in a multiple cluster system to determine when memory lines are added to the coherence directory, when memory lines are removed from the directory, and when information associated with each memory line is updated. By using the coherence directory, the techniques of the present invention recognize that the number of transactions such as probe requests can be reduced by managing or filtering probes that do not need to be sent to specific clusters.

FIG. 8 is a diagrammatic representation showing probe filter information that can be used to reduce the number of transactions in a multiple cluster system. Any criterion that can be used to reduce the number of clusters probed from a home cluster is referred to herein as probe filter information. Transactions such as probe requests can have a variety of characteristics. Some characteristics include whether the probe is a read block (read) 823 or a read block modify (read/write) 825. Other characteristics of the probe include the state of the memory line associated with the probe. In some examples, states include invalid 831, shared 833, owned 835, and modified 837. According to various embodiments, a coherence directory maintains information for memory lines in the local cluster that are cached in non-local clusters, where non-local clusters can include request and remote clusters.

If the state of the memory line associated with a probe is invalid 831 as indicated in the coherence directory, no copies of the memory line reside in other clusters. Consequently, only the home cluster needs to be probed and a completion bit can be used to indicate to a request cluster that the request cluster should expect only a single response from home cluster instead of a response from each of the clusters. If the memory line associated with the probe is in the shared state 833, and the transaction is a read transaction, only the home cluster needs to be probed and a completion bit can again be used to indicate to the request cluster that only a single response from home cluster should be expected as indicated in entry 803. It should be noted that the completed bit can not be used in entries 811 and 813.

For read transactions on owned memory lines, only the remote cluster with the line cached in the owned state needs to be probed. The remote cluster can transmit the response with a completion bit back to a request cluster. For transactions on modified memory lines, the probe can be sent to the remote cluster with the line cached in the modified state. Although transactions such as read block (read) and read block modify (read/write) are described, it should be noted that other transactions such as test and test and set are contemplated.

According to various embodiments, when the only cluster that needs to be probed is the home cluster, only the nodes in the home cluster are probed. No probes are transmitted to any request or remote cluster. However, when the only cluster that needs to be probed is a remote or request cluster, not only are the nodes in the remote cluster probed, but the nodes in the home cluster are probed as well. According to various embodiments, the techniques of the present invention provide that when only a remote or request cluster needs to be probed, the memory controller can sometimes be bypassed to allow probing of only the remote or request cluster. In one example, a probe is not forwarded to the home cluster memory controller and a probe is forwarded directly to the remote cluster from the home cluster cache coherence controller.

FIG. 9 is a diagrammatic representation showing exemplary memory controller filter information. Any criterion used to reduce the number of requests forwarded to a memory controller is referred to herein as memory controller filter information. Characteristics of a probe can again be analyzed when a cache coherence controller receives the probe from a request cluster. Transactions such as probe requests can have a variety of characteristics. Some characteristics include whether the probe is a read block (read) 923 or a read block modify (read/write) 925. Other characteristics of the probe include the state of the memory line associated with the probe. In some examples, states include invalid 931, shared 933, owned 935, and modified 937. When the state of the memory line associated with the probe is invalid 931, no remote probes are required because not remote clusters have a copy of the memory line in cache. The cache coherence controller also has no knowledge of the home cluster cache state. The probe is consequently forwarded to the memory controller.

For read block transactions on a shared memory line 903, there is no need to probe the remote clusters as the home cluster contains a valid copy of the memory line in either cache or the memory controller. Consequently the probe is forwarded to the memory controller. For read block modify transactions on shared memory lines 911, the local node state is unknown and the probe is sent to the memory controller.

For read block transactions on an owned memory line 905, there is no need to send a probe request to the target or probe local nodes as the owned state implies that the home cluster caches are invalid or shared. A probe is forwarded directly to the owning cluster to acquire the cached data. For read block write transactions on an owned memory line 913, the local state is unknown and consequently the request is forwarded to the memory controller. When the state of the memory line associated with the request is modified 937, there is no need to probe local nodes, as a modified state implies the home cluster state is invalid. A probe is forwarded to the cluster owning the memory line.

Techniques and mechanisms for reducing the number of probes and probe requests in a system by using a coherence directory along with probe filter information and memory controller filter information are described in U.S. patent application Ser. Nos. 10/288,347 and 10/288,399, both titled Methods And Apparatus For Managing Probe Requests by David B. Glasco and filed on Nov. 4, 2002, the entireties of which are incorporated by reference herein for all purposes.

A coherence directory can be used to filter unnecessary probes. However, in many instances, the coherence directory does not receive information on all changes in memory lines in remote caches. Consequently, the coherence directory can fill with stale data. In one example, a remote cache may cache a memory line and later replace the memory line in the cache without providing any information to various coherence directories in the system. Notification is not required to maintain coherency. The stale information results in unnecessary probing of remote clusters.

In one example, the coherence directory typically makes conservative assumptions about the global cache state of a given memory line given the imprecise information the coherence directory often receives. For instance, if a first cluster has a copy of a memory line in a shared state, the coherence directory will note that the first cluster has a copy of the memory line in the shared state. If a first processor in the first cluster later replaces the memory line, the coherence directory typically has no mechanism for ascertaining information about the state change. The coherence directory will still indicate that the memory line in the first cluster is cached in a shared state. Having the state of the memory line in the first cluster remain in the shared state is fine in some instances, but could be an inconsistent or stale representation in other instances.

In one example, the memory line is cached only in the first cluster. A second processor from the first cluster fetches the line that is still held by the first processor in a shared state. The second processor will receive a shared response from the first processor and install the memory line in a shared state. The coherence directory, initially noting that the memory line in the first cluster is in the shared state, maintains the information that the memory line is in the shared state because it typically has limited mechanisms for obtaining information about certain state changes. In this example, the new state of the memory line in the first cluster is consistent with the state of the memory line noted in the coherence directory.

Figure 10:
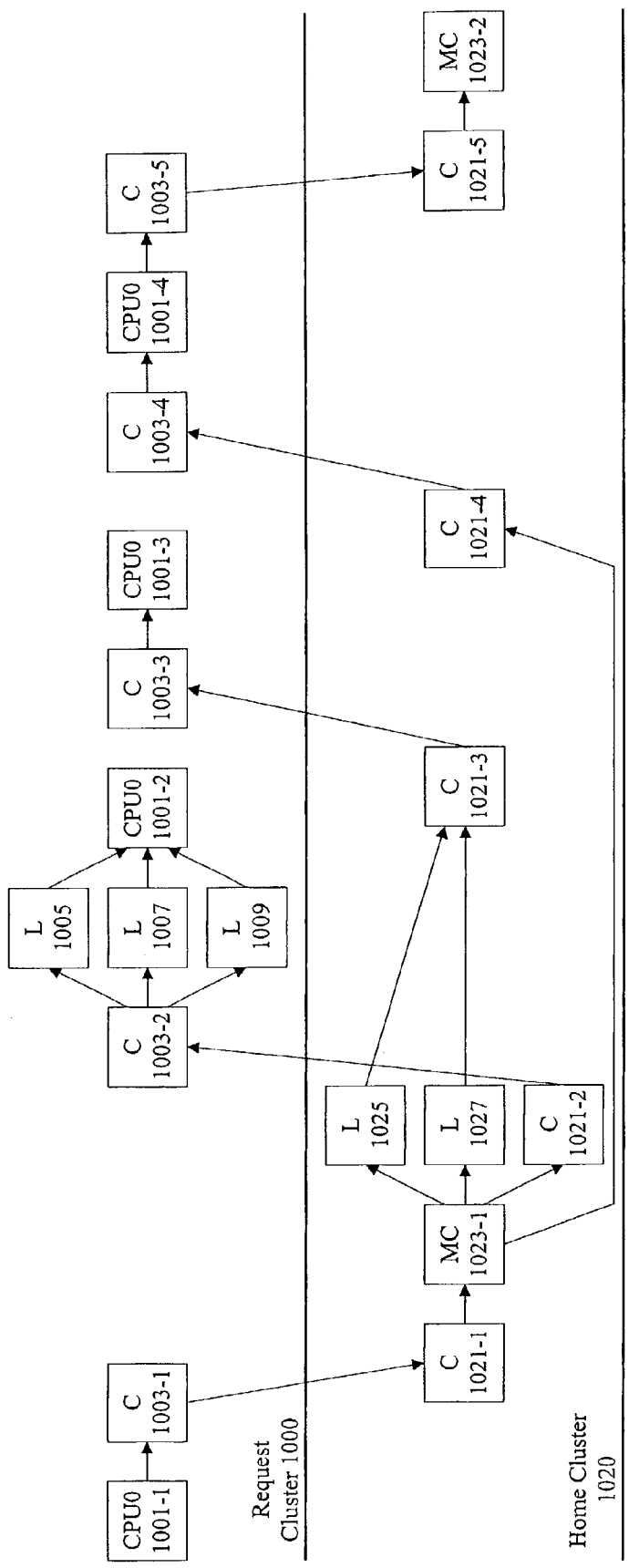
FIG. 10 is a diagrammatic representation showing a typical request from a request cluster.

If the memory line is evicted from the cache of the first processor, the second processor will install the line in an exclusive state, as it will be the only cached copy. However, the coherence directory will still indicate that the memory line in the first cluster is in the shared state, because the coherence directory did not receive any information about the eviction of the memory line. This results in an inconsistent coherence directory state, as the coherence directory has the memory line in a shared state while the memory line in the first cluster is actually held in the exclusive state. Hence, the coherence directory forces the second processor into a shared state by providing a response indicating that the memory line is shared. In one example, the coherence directory indicates that the memory line is shared setting a shared bit in the response to the request cluster from the home cluster FIG. 10 is a diagrammatic representation depicting the transactions for a typical data request from a local processor sent to a home cluster using a cache coherence controller. The multicluster system includes a request cluster 1000 and a home cluster 1020. According to various embodiments, a first processor 1001-1 (denoted as CPU0) in a local cluster 1000 sends a read request to a cache coherence controller 1003-1. The cache coherence controller 1003-1 forwards the request to a cache coherence controller 1021-1 in a home cluster 1020. The cache coherence controller 1021-1 at the home cluster 1020 receives the access request. In one example, information associated with the requests is stored in pending buffers associated with the various cache coherence controllers. Information about the state of local address space memory lines cached in non-local clusters is maintained in coherence directories associated with the various cache coherence controllers. According to various embodiments, the cache coherence directory has information about memory lines in the home cluster address space cache in other clusters such as the request cluster 1000. In this example, the coherence directory indicates that the memory line is not cached remotely.

Since the memory line is not cache remotely, no probes need to be sent to any other clusters other than the home and request clusters. The cache coherence controller 1021-1 forwards the access request to a home cluster memory controller 1023-1. The memory controller 1023-1 locks the memory line and probes local nodes 1025 and 1027 as well as cache coherence controller 1021-2.

Using the coherence directory, the cache coherence controller 1021-2 notes that the line is not cached remotely and sends a request only to the request cluster 1000. The cache coherence controller 1003-2 associated with the request cluster 1000 receives a probe and forwards the probe to local nodes associated with cache blocks 1005, 1007, and 1009 to probe the cache blocks in the request cluster 1000. Processor 1001-2 receives probe responses from the local nodes associated with cache blocks 1005, 1007, and 1009.

According to various embodiments, cache coherence controller 1021-3 accumulates probe responses and sends the probe responses to cache coherence controller 1003-3, which in turn forwards the probe responses to the processor 1001-3. Cache coherence controller 1021-4 also sends a read response to cache coherence controller 1003-4, which forwards the read response to processor 1001-4. After receiving the fetched data, processor 1001-4 may send a source done response to cache coherence controller 1003-5. According to various embodiments, the transaction is now complete at the requesting cluster 1000. Cache coherence controller 1003-5 forwards the source done message to cache coherence controller 1021-5. The memory line in the coherence directory associated with the home cluster 1020 is held in the shared state, with the request cluster 1000 included in the occupancy vector. Upon receiving the source done message, the memory controller 1023-2 can unlock the memory line and the transaction at the home cluster 1020 is now complete. Another processor can now access the unlocked memory line.

However, in typical implementations, no state information associated with the memory line is sent from the request cluster 1000 to the home cluster 1020. For example, if the memory line is evicted from the request cluster processor cache, no notification is sent to the home cluster. Consequently, the cache coherence controller in the home cluster has no mechanism for updating the state of the memory line in the home cluster from shared to invalid when the memory line is silently evicted from remote processor caches. The occupancy vector for the entry in the coherence controller continues to maintain an entry for the memory line indicating that the request cluster has a shared copy.

Figure 11:
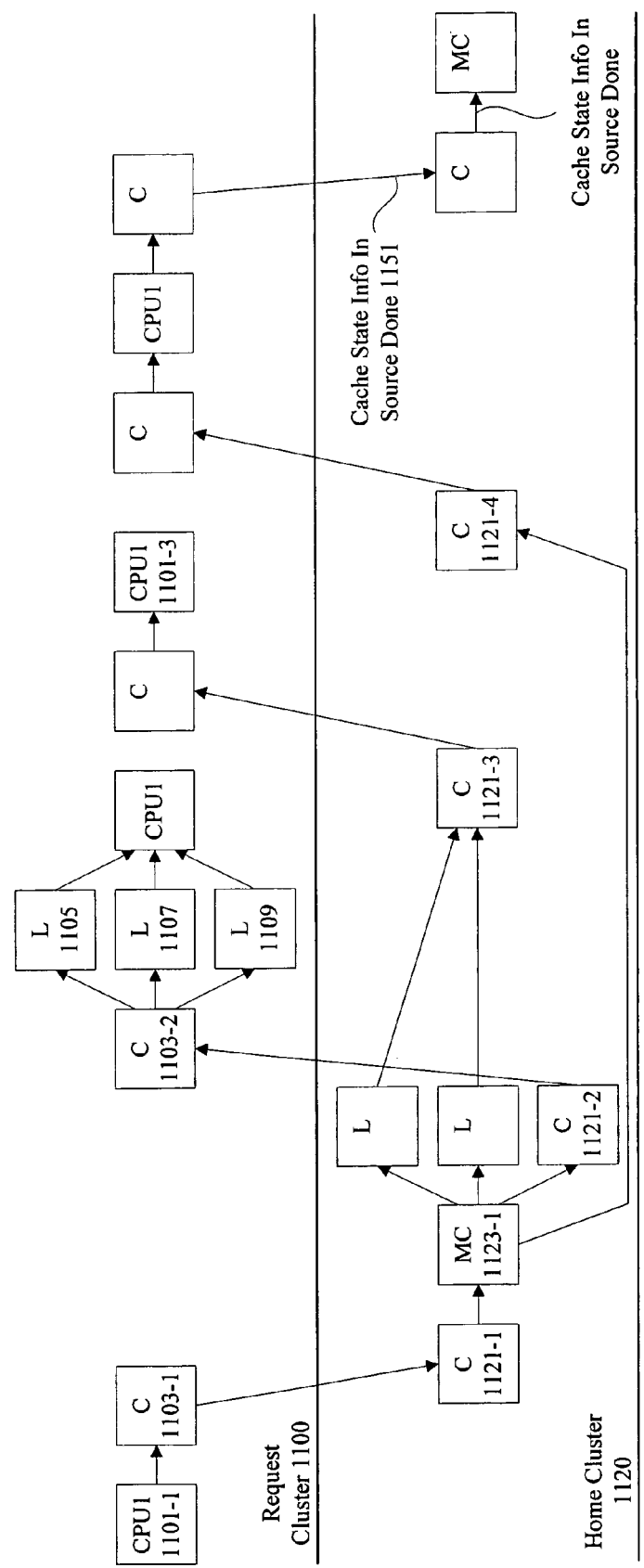
FIG. 11 is a diagrammatic representation showing request cluster cache state information being provided to a home cluster.

FIG. 11 is a diagrammatic representation depicting the transactions for read request from another request cluster processor sent to a home cluster after the memory line has been evicted in the request cluster. The multicluster system includes a request cluster 1100 and a home cluster 1120. According to various embodiments, a second processor 1101-1 (denoted as CPU1) in a local cluster 1100 sends a read request for a memory line recently evicted. The cache coherence controller 1103-1 forwards the request to a cache coherence controller 1121-1 in a home cluster 1120. The cache coherence controller 1121-1 at the home cluster 1120 receives the access request. In typical implementations, the coherence directory associated with the cache coherence controller 1121-1 indicates that the memory line is shared in the request cluster.

The cache coherence controller 1121-2 receives a probe associated with the request serialized at a memory controller 1123-1 and sends the probe to the request cluster 1100. CPU1 receives responses from local nodes 1105, 1107 and 1109 in addition to responses from coherence controller 1121-3 and 1121-4. The accumulated response states indicates if CPU1 can install the line in a shared or exclusive state. In this example, processor 1101-3 receives the response and installs the cache line in a shared state as a result of the shared state information from the home cluster 1120. However, the information from the home cluster is stale, as the memory line in the request cluster has already been silently evicted. In this instance, the processor 1101-3 could have installed the cache line in the exclusive state, which could have provided a performance advantage for subsequent writes by the processor to the same memory line. It should be noted that the information indicating if the processor can cache the line in a shared or exclusive state can be carried in the shared bit in the response packet.

The techniques of the present invention provide that the home cluster cache coherence controller 1121-3 no longer forces the memory line into a shared state when only a request cluster is believed to have a shared copy of the memory line. According to various embodiments, the shared state is still forced when another cluster such as a remote cluster has a copy of the memory line in the shared state. When a cache coherence controller 1121-3 sends a probe response back to the request cluster 1100, a shared bit is not set if only the request cluster is believed to have a shared copy of the memory line. The processor 1101-3 determines if the cache line is still shared in the cluster by examining the shared bit in the response packets. In one example, cache 1105 is associated with CPU0 and still has a shared copy of the memory line. The processor 1101-3 would then install the cache line associated with CPU1 in the shared state. However, if the processor 1101-3 determines that the cache line has been evicted, then the processor 1101-3 can install the cache line in the exclusive state. As noted above, installing the cache line in the exclusive state allows for more efficient subsequent writes by the same processor, as no probing needs to be performed to invalidate shared copies in other caches.

However, the cache state in the request cluster is now inconsistent with the information in the coherence directory of cache coherence controller 1121-3. The techniques and mechanisms of the present invention provide that cache state information is provided in a source done message 1151 sent from the request cluster 1101 to the home cluster 1120. The cache state information, in one example, indicates to the cache coherence controller whether the cache line was installed in the shared or exclusive state. The coherence directory in the home cluster 1120 can then be updated to reflect the cache state in the request cluster.

FIG. 12 is a table showing coherence directory state updates. The notation OVL[j] refers to the occupancy vector entry for cluster j. A nonzero value indicates the coherence directory has the memory line cached in cluster j. Entries 1201, 1205, 1209, and 1213 indicate that if the cache line was installed in the shared state, the final directory state would be shared or owned. If the initial directory state was invalid or shared, the final directory state would be set to shared. If the initial coherence directory state was owned or modified, the final coherence directory state would be set to owned.

However, if no other caches, either local or remote, have a copy of the memory line, the cache line can be installed in the exclusive state. In entries 1203 and 1215, the memory line is installed in the exclusive state, no other caches have a copy of the memory line, and the information in the coherence directory was accurate. The cache state information associated with the source done message is used to update the coherence directory in the home cluster to reflect an installed modified state. In entries 1207 and 1211, the memory line is installed in the exclusive state, no other caches have a copy of the memory line, but the information in the coherence directory was stale. The cache state information associated with the source done message is used to update the coherence directory in the home cluster to reflect an installed modified state.

A silent eviction of a shared copy of a memory line is one example of a transaction that may lead to inaccurate coherence directory information. Another transaction that can lead to an inaccurate directory state is a failed change to dirty transaction. Transactions changing a cache state to modified from a shared or owned state are referred to herein as change to dirty transactions. In one example, if a processor in a remote cluster has a given memory line cached in a shared state and then generates a change to dirty request, the line may be invalidated by a request cluster processor's ownership request prior to the completion of the change to dirty. The intervening invalidation results in a failure of the change to dirty, but the coherence directory is typically unable to detect this sequence. Consequently, the coherence directory typically assumes that the change succeeds, and the line is installed in a modified state in the requesting processor cache. The techniques of the present invention allow a coherence directory to maintain accurate state information even when a change to dirty transaction fails. In one example, the final done response provides cache state information to a home cluster coherence directory to again allow the coherence directory to more accurately reflect the states of remote cache lines.

Figure 13:
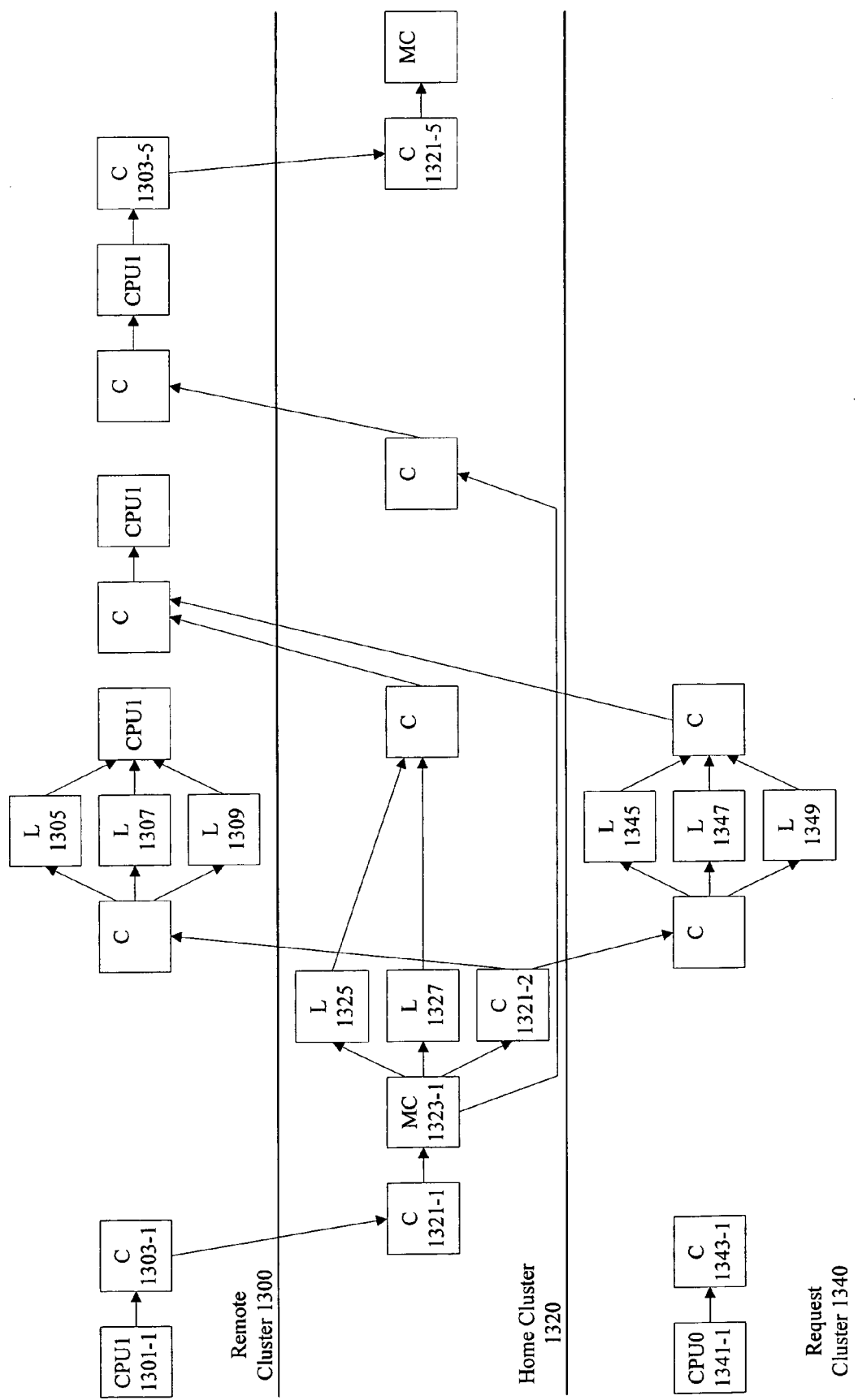
FIG. 13 is a diagrammatic representation showing a change to dirty and an intervening request.

FIG. 13 is a diagrammatic representation depicting a change to dirty request and an intervening invalidating request. The multicluster system includes a remote cluster 1300, a home cluster 1320, and a request cluster 1340. According to various embodiments, a processor 1341-1 (denoted as CPU0) in a request cluster 1340 sends a change to dirty request to a cache coherence controller 1343-1. In one example, a change to dirty request is a request placing a memory line in a modified state from a shared or owned state. However, an intervening request from a processor 1301-1 (denoted as CPU1) is serialized before the change to dirty request is serialized. In one example, the intervening request reaches the memory controller 1323-1 before the change to dirty request. The intervening request from a processor 1301-1 in a remote cluster 1300 is forwarded to a cache coherence controller 1321-1 in a home cluster 1320 from the cache coherence controller 1303-1 in remote cluster 1300. In one example, the intervening request is a read for ownership that invalidates all cached copies of the memory line.

The cache coherence controller 1321-1 at the home cluster 1320 receives the intervening request. The cache coherence controller 1321-2 will receive the intervening request serialized before the change to dirty request at a memory controller 1323-1 and send invalidating probes to the remote and request clusters 1300 and 1340 which in turn invalidate the corresponding cache line in nodes 1305, 1307, 1309, 1345, 1347, and 1349. Any corresponding cache line is also invalidated at local nodes 1325, and 1327. Probes responses are sent to remote cluster 1300 along with a read response. In typical implementations, no installed cache state information is provided by the cache coherence controller 1303-5 in the remote cluster 1300 to the cache coherence controller 1321-5 in the home cluster. Consequently, the coherence directory may have stale information about the state of various cache lines in remote clusters. According to various embodiments of the present invention, information is provided with a final done response to indicate if a line was installed in a shared, exclusive, owned, or modified state. The information can be used provide a coherence directory with information on whether a change to dirty transaction was successful. Consequently, the coherence directory no longer has to assume that a change to dirty was successful and maintain that the memory line is cached in a modified state, but can instead have information that a memory line is cached in an invalid state if the transaction failed.

Figure 14:
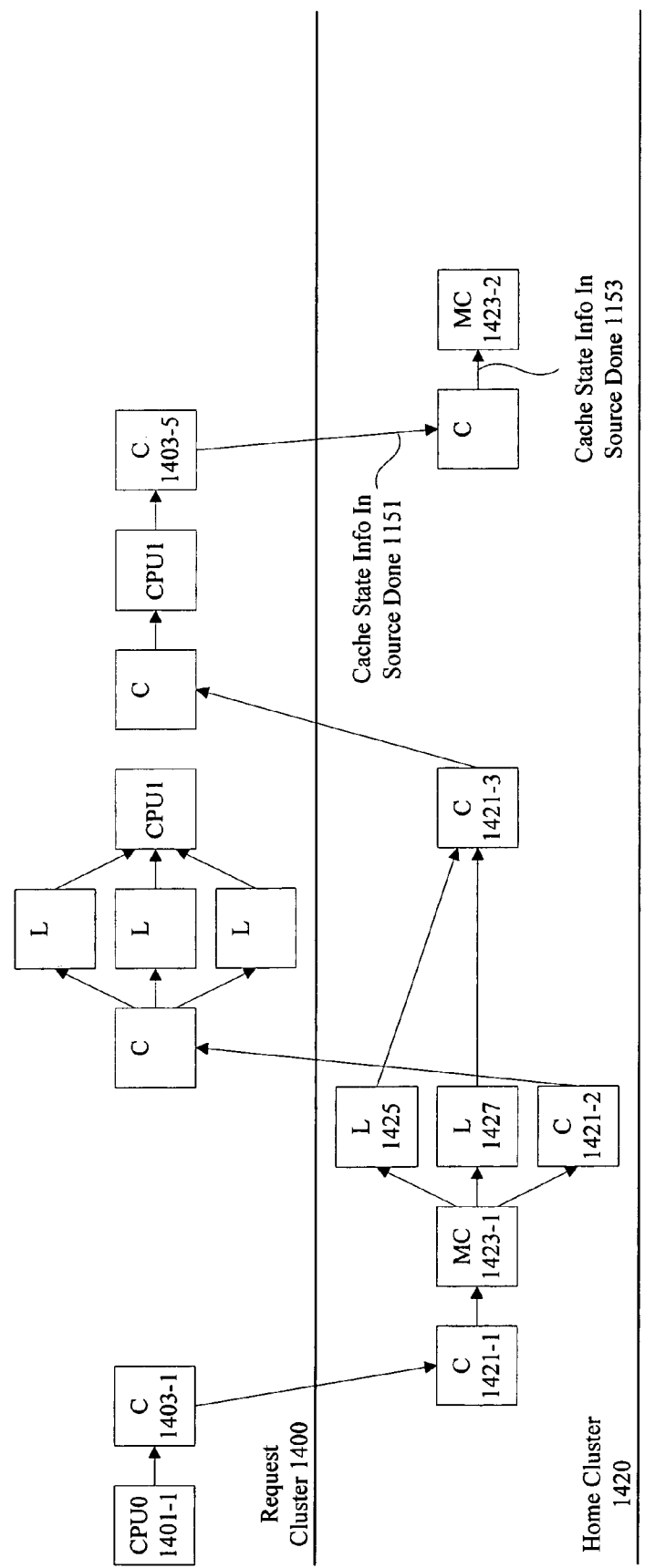
FIG. 14 is a diagrammatic representation showing completion of a change to dirty request.

FIG. 14 is a diagrammatic representation depicting a change to dirty request for a memory line after an intervening request has invalidated the memory line in the change to dirty requesting processor's cache. The multicluster system includes a request cluster 1400 and a home cluster 1420. According to various embodiments, a processor 1401-1 (denoted as CPU0) in a local cluster 1400 sends a change to dirty request for a memory line that will be invalidated after the change to dirty request is generated but prior to completion of the change to dirty request. The cache coherence controller 1403-1 forwards the request to a cache coherence controller 1421-1 in a home cluster 1420. The cache coherence controller 1421-1 at the home cluster 1420 receives the change to dirty request.

The cache coherence controller 1421-2 receives a probe associated with the request serialized at a memory controller 1423-1 and sends the probe to the request cluster 1400. Local nodes 1425 and 1427 also receive probes from the memory controller 1423-1 and sends probe responses to cache coherence controller 1421-3. For a change to dirty transaction, the memory controller does not generate a read response. In the ideal case, the request cluster retains a copy of the line and all other caches are invalidated. For the race case, the requester is invalidated, but an owning cache will respond with a read response packet having the data. The failure results from the case in which the requester's copy is invalidated but no other caches have the line dirty when the probe for the change to dirty is received. The other cluster may have modified the line and written it back to memory.

In examples where no data is supplied, the change to dirty request fails and the memory line is installed in the invalid state. In typical examples, the coherence directory would maintain the line in the modified state because information about cache state could not be provided to the home cluster. However, according to various embodiments, the installed state of invalid is provided back to the home cluster coherence directory by the cache coherence controller 1403-5. The coherence directory is updated and a source done is forwarded to the memory controller 1423-2.

As noted above, there are cases when an intervening invalidating probe will not necessarily cause a change to dirty request to fail. FIG. 15 is a table showing various cases where a change to dirty request may succeed or fail. Entry 1501 indicates that if the coherence directory is maintaining the state of the memory line as shared or owned by the requesting cluster when the change to dirty request is received, the installed state and the final coherence directory state will both be modified. According to various embodiments, this case represents a situation where no intervening invalidation request was received. Entries 1507 and 1509 indicate situations where an intervening request causes the change to dirty request to fail. If the directory state is invalid when the change to dirty request is received, no data is available and the installed state as well as the final coherence directory state are set to invalid as shown in entry 1507. The change to dirty request fails. Similarly, if the state of the memory line is shared but the change to dirty requesting cluster does not have a shared copy of the memory line, no data is available and the installed as well as final coherence directory state are set to invalid as shown in entry 1509.

However, there are several situations where intervening invalidating requests do not cause a change to dirty request to fail. If an intervening request places the memory line in a coherence directory in an owned or modified state as shown in entries 1503 and 1505, the owning cluster can supply the data and the installed state of the memory line as well as the final coherence directory state are set to modified.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with multiple processor clusters connected through a point-to-point, switch, or bus architecture. In another example, multiple clusters of processors may share a single cache coherence controller, or multiple cache coherence controllers can be used in a single cluster. Therefore, the scope of the invention should be determined with reference to the appended claims.

What is claimed is:

1. A computer system, comprising:
a home cluster including a first plurality of nodes and a home cache coherence controller associated with a coherence directory, the coherence directory having state information corresponding to home cluster memory lines cached remotely;
a request cluster including a second plurality of nodes and a request cache coherence controller, the request cache coherence controller configured to probe request cluster nodes to obtain cache state information associated with a memory line, wherein the cache state information is provided to a request cluster processor and to the home cache coherence controller to provide the home cache coherence controller with accurate cache state information for updating the coherence directory.

2. The computer system of claim 1, wherein the probe is associated with a read request.

3. The computer system of claim 2, wherein the cache state information provided to the request cluster processor indicates that the memory line is held in the shared state in the request cluster.

4. The computer system of claim 3, wherein the coherence directory indicates that the memory line is shared by the request cluster.

5. The computer system of claim 4, wherein the cache state information provided to the home cache coherence controller indicates that the memory line is held in the shared state in the request cluster.

6. The computer system of claim 5, wherein the coherence directory is maintained to indicate that the request cluster has a shared copy of the memory line after the cache state information is provided.

7. The computer system of claim 1, wherein the cache state information provided to the request cluster processor indicates that the memory line is held in the exclusive state in the request cluster.

8. The computer system of claim 7, wherein the coherence directory indicates that the memory line is shared by the request cluster.

9. The computer system of claim 8, wherein the cache state information provided to the home cache coherence controller indicates that the memory line is held in the exclusive state in the request cluster.

10. The computer system of claim 9, wherein the coherence directory is updated to indicate that the request cluster has ownership of the memory line in a modified state after the cache state information is provided if no other clusters are identified as having a shared copy of the memory line.

11. The computer system of claim 1, wherein the cache state information provided to the home cluster indicates that the memory line is held in a shared or exclusive state.

12. A method, comprising:
receiving a read request associated with a memory line from a first processor in a first cluster;
probing nodes in the first cluster to obtain cache state information associated with the memory line;
forwarding cache state information to the first processor;
forwarding cache state information to a second cluster to update a coherence directory in the second cluster, wherein the coherence directory provides state information of cache memory lines.

13. The method of claim 12, wherein the first cluster is a request cluster and the second cluster is a home cluster.

14. The method of claim 13, wherein the cache state information provided to the request cluster processor indicates that the memory line is held in the shared state in the request cluster.

15. The method of claim 14, wherein the coherence directory indicates that the memory line is shared by the request cluster.

16. The method of claim 15, wherein the cache state information provided to the home cache coherence controller indicates that the memory line is held in the shared state in the request cluster.

17. The method of claim 16, wherein the coherence directory is maintained to indicate that the request cluster has a shared copy of the memory line after the cache state information is provided.

18. The method of claim 13, wherein the cache state information provided to the request cluster processor indicates that the memory line is held in the exclusive state in the request cluster.

19. The method of claim 18, wherein the coherence directory indicates that the memory line is shared by the request cluster.

20. The method of claim 19, wherein the cache state information provided to the home cache coherence controller indicates that the memory line is held in the exclusive state in the request cluster.

21. The method of claim 20, wherein the coherence directory is updated to indicate that the request cluster has ownership of the memory line in a modified state after the cache state information is provided if no other clusters are identified as having a shared copy of the memory line.

22. An apparatus, comprising:
means for receiving a read request associated with a memory line from a first processor in a first cluster;
means for probing nodes in the first cluster to obtain cache state information associated with the memory line;
means for forwarding cache state information to the first processor;
means for forwarding cache state information to a second cluster to update a coherence directory in the second cluster, wherein the coherence directory provides state information of cache memory lines.

23. A computer system, comprising:
a home cluster including a first plurality of nodes and a home cache coherence controller associated with a coherence directory, the coherence directory having state information corresponding to home cluster memory lines cached remotely;
a request cluster including a second plurality of nodes and a request cache coherence controller, the request cache coherence controller configured to forward a change to dirty request to a home cluster and probe request cluster nodes to obtain cache state information associated with a memory line, wherein the cache state information is provided to a request cluster processor and to the home cache coherence controller to provide the home cache coherence controller with information to determine whether the change to dirty request was successful.

24. The computer system of claim 23, wherein the coherence directory indicates that the memory line is shared or owned by the request cluster when the change to dirty request causes a serialization point to lock the memory line.

25. The computer system of claim 24, wherein the cache state information provided to the request cluster indicates that the memory line is held in a modified state in the request cluster.

26. The computer system of claim 25, wherein the coherence directory is updated to indicate that the request cluster has a modified copy of the memory line after the cache state information is provided, indicating that the change to dirty request was successful.

27. The computer system of claim 23, wherein an intervening request for the memory line from a remote cluster is received after a request cluster processor issues the request but before the request causes a serialization point to lock the memory line.

28. The computer system of claim 27, wherein the coherence directory indicates that the memory line is owned by a remote cluster and the memory line is in an owned or modified state.

29. The computer system of claim 28, wherein the owned or modified state indicates that the memory line was invalidated by the intervening request.

30. The computer system of claim 29, wherein the change to dirty request invalidates all copies of the memory line in all non-request clusters and acquires data from the remote cluster owning the memory line.

31. The computer system of claim 23, wherein an intervening request for the memory line from a remote cluster is received after a request cluster processor issues the request but before the request causes a serialization point to lock the memory line.

32. The computer system of claim 31, wherein the coherence directory indicates that the memory line is held in an invalid or shared state, the request cluster not having a shared copy of the memory line.

33. The computer system of claim 32, wherein the invalid or shared state indicates that the memory line was invalidated by the intervening request and the memory line is not owned by any particular cluster.

34. The computer system of claim 33, wherein the change to dirty request invalidates all copies of the memory line in all non-request clusters but fails because no data is supplied to the request cluster.

35. The computer system of claim 23, wherein the change to dirty request is a request to change a request cluster shared memory line to a modified state.

36. The computer system of claim 23, wherein the change to dirty request is a request to change a request cluster owned memory line to a modified state.

37. The computer system of claim 23, wherein the cache state information provided to the home cluster indicates that the memory line is held in a modified or invalid state.

* * * * *